United States Patent
Greenberg et al.

(10) Patent No.: US 9,098,361 B1
(45) Date of Patent: Aug. 4, 2015

(54) SYSTEM AND METHOD FOR INTEROPERABILITY BETWEEN AN EMBEDDED ACTIVEX CONTROL AND AN EXTERNAL APPLICATION

(71) Applicant: NICE-SYSTEMS LTD., Ra'anana (IL)

(72) Inventors: Bentzion Greenberg, Netanya (IL); Vitaly Shelest, Holon (IL); Alexander Vaindiner, Or-Akiva (IL)

(73) Assignee: NICE-SYSTEMS LTD., Ra'anana (IL)

( * ) Notice: Subject to any disclaimer, the term of this patent is extended or adjusted under 35 U.S.C. 154(b) by 0 days.

(21) Appl. No.: 14/219,033

(22) Filed: Mar. 19, 2014

(51) Int. Cl.
*G06F 13/00* (2006.01)
*G06F 9/54* (2006.01)

(52) U.S. Cl.
CPC ...................................... *G06F 9/546* (2013.01)

(58) Field of Classification Search
CPC .................................. G06F 9/465; G06F 9/547
USPC .................................................. 719/316, 330
See application file for complete search history.

(56) References Cited

U.S. PATENT DOCUMENTS

| | | |
|---|---|---|
| 6,195,794 B1 * | 2/2001 | Buxton .......................... 717/108 |
| 2009/0293066 A1 * | 11/2009 | Low .............................. 719/316 |
| 2014/0280431 A1 | 9/2014 | Shelest |

OTHER PUBLICATIONS

Marshaling Details: http://msdn.microsoft.com/en-us/enus/library/windows/desktop/ms692621(v=vs.85).aspx Printed on May 15, 2014.

Type Libraries and ActiveX Objects [Automation]: http://msdn.microsoft.com/en-us/enus/library/windows/desktop/ms221581(v=vs.85).aspx Printed on May 15, 2014.

* cited by examiner

*Primary Examiner* — Andy Ho
(74) *Attorney, Agent, or Firm* — Pearl Cohen Zedek Latzer Baratz LLP (57) ABSTRACT

A system and method for enabling interoperability between an embedded object and an external application. A method may include modifying an original component included in a system to generate a modified component, the modified component adapted to intercept a call to create an instance of the embedded object; obtaining a reference to the instance of the embedded object; storing the reference in a pointers container; generating a representation of the instance based on information in the pointers container, and providing the representation to the external application.

16 Claims, 3 Drawing Sheets

ActiveX Anchor Properties

Object | Advanced | Extended

Object Status
- ☐ Enable        ⦿ On   ○ Off
- ☑ Visible       ⦿ On   ○ Off
- ☐ Has focus     ○ On   ⦿ Off
- ☑ Windowless    ⦿ On   ○ Off

[OK] [Cancel] [Apply]

~615

ActiveX Anchor Properties

Object | Advanced | Extended

☑ Custom Properties

| Names | Values |
|---|---|
| ☐ Screen Type | 0 |
| ☐ ShowHostDialog | false |
| ☐ ShowLightPenCursor | false |
| ☐ SmartInsert | 0 |
| ☐ SplitDisplay | true |
| ☐ SupportsStructuredFields | 0 |
| ☑ TerminalID | false |
| ☐ TextAssistMode | 1000 |
| ☐ TextBlinkRate | |

[OK] [Cancel] [Apply]

~620

ActiveX Anchor Properties

Object | Advanced | Extended

- ☑ ProgID           [Wall Data Mainframe Display.12]   ☐ as Substring
- ☐ Case sensitive compare
- ☑ Class ID         {91858523-87B5-11CE-A0B6-0800095A05C3}
- ☑ Interface ID     {AE434A2D-4738-4BAD-866B-59281909FE99}
- ☑ Index in Type    1

Coordinates
- ☐ Left: 0    ☐ Width:  1054
- ☐ Top:  0    ☐ Height: 687

[OK] [Cancel] [Apply]

~610

SYSTEM AND METHOD FOR INTEROPERABILITY BETWEEN AN EMBEDDED ACTIVEX CONTROL AND AN EXTERNAL APPLICATION

BACKGROUND OF THE INVENTION

Embedded objects are known in the art. Generally, embedded objects are individual software modules designed to carry out specific tasks, functions or operations. Accordingly, embedded objects can be used as building blocks in developing computer programs. For example, a software application can call on an embedded object for implementing a particular task. Examples of embedded objects are Component Object Model (COM), Object Linking and Embedding (OLE) and ActiveX, all of which provided by Microsoft. COM and OLE were replaced by (and are included in) ActiveX. ActiveX controls are generally small programs that can be embedded in other programs or software applications. For example, an ActiveX control may include COM programs (modules) that implement Graphic User Interface (GUI) functionality.

ActiveX controls may be embedded into applications. For example, Internet Explorer, Microsoft Office, Microsoft Visual Studio and Windows Media Player all include or use ActiveX objects.

However, there currently exists no effective way for a first application (or external application) to interoperate with an ActiveX control embedded in a second application (or embedding application). Typically, ActiveX does not provide the ability to share information and functionality across application boundaries.

More specifically, an ActiveX control embedded in an application is executed in the context of the embedding application, but the embedding application does not expose the embedded ActiveX control to external applications. There currently exist no systems or methods for a standard and/or automated interface with an embedded ActiveX control. For example, there exists no system or method to enable an external application to obtain or access properties, methods and/or events of an embedded ActiveX control.

SUMMARY OF EMBODIMENTS OF THE INVENTION

A system and method for enabling interoperability between an embedded object and an external application. A method may include modifying an original component included in a system to generate a modified component, the modified component adapted to intercept a call to create an instance of the embedded object; obtaining a reference to the instance of the embedded object; storing the reference in a pointers container; generating a representation of the instance based on information in the pointers container, and providing the representation to the external application.

Generating the representation of the instance may be performed in real-time. A representation of, and data related to, an instance of an embedded object may be sent to a monitoring unit, Generating a representation for an instance of an embedded object may be selective, based on a type of the embedded object. A representation may be generated and provided according to the .NET framework. A representation may be generated upon receiving a request from an external application. A system or method may determine an instance of an embedded object was destroyed and may remove a reference to the instance from a pointers container. An embedded object may be an ActiveX object.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those having ordinary skill in the art that the invention may be practiced without these specific details. In other instances, well-known methods, procedures, components, modules, units and/or circuits have not been described in detail so as not to obscure the invention.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like.

Unless explicitly stated, the method embodiments described herein are not constrained to a particular order or sequence. Additionally, some of the described method embodiments or elements thereof can occur or be performed at the same point in time or overlapping points in time. As known in the art, an execution of an executable code segment such as a function, task, sub-task or program may be referred to as execution of the function, program or other component.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

In the present specification, an application that embeds an ActiveX control is referred to as an embedding application. In the present specification, an application other than an embedding application that accesses an embedded ActiveX control is referred to as an external application.

Figure 1:
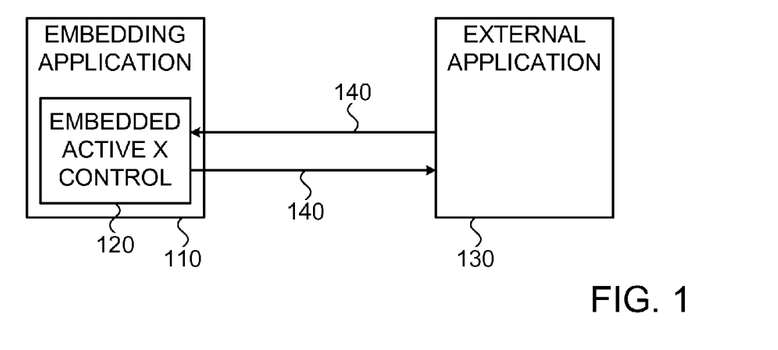
FIG. 1 shows exemplary embedding application, embedded object and external application according to embodiments of the invention.

Reference is made to FIG. 1, which shows an exemplary embedding application 110, an exemplary embedded ActiveX control 120 and an exemplary external application 130. As described herein, embodiments of the invention enable external application 130 to interoperate with embedded ActiveX control 120. For example, as shown by arrows 140, external application 130 may send and receive data to/from embedded ActiveX control 120. For example, external application 130 may read or view values in variables included in embedded ActiveX control 120 or external application 130 may set or modify values in variables included in embedded ActiveX control 120.

Of course, in various scenarios, a first application may be an embedding application that embeds a first ActiveX control and a second application may be an embedding application that embeds a second ActiveX control. Accordingly, the first application may be an embedding application but may also be, or function as, an external application, e.g., when accessing the second ActiveX control embedded in the second application. For example, external application 130 may itself embed an ActiveX control (not shown) and, when accessing the ActiveX control embedded in external application 130, embedding application 110 may function as an external application.

Accordingly, it will be understood that the terms "embedding application" and "external application" may be used to describe a role that an application assumes in a scenario but do not otherwise limit the type or nature of an application. For example, an application may be referred to as an "external application" when accessing an ActiveX control embedded in another application and as an "embedding application" when embedding an ActiveX control being accessed by another application.

An external application may be an application executed on the same computer executing the embedding application or it may be an application executed on a remote computer. For example, embodiments of the present invention enable interoperability, over a network, between an embedded ActiveX control and an external application.

An embodiment of the present invention enables real-time and full interaction between an external application and an ActiveX control embedded in an embedding application. As referred to herein, interoperability between an external application and an embedded ActiveX control includes enabling the external application to cause execution of the embedded ActiveX control, set values of variables or parameters in the embedded ActiveX control or otherwise exchange data with the embedded ActiveX control.

Interoperability can be or can include exposing and setting parameter values of the embedded ActiveX control and the like. Typically, interoperability includes exposing (e.g., making public) objects or items such as variables and functions defined and used by an embedded ActiveX control.

For example, embodiments of the present invention may expose objects in an embedded ActiveX control to an external application to enable the external application to read and set values of variables in the embedded ActiveX control, execute procedures or functions in embedded ActiveX control and so on. Although interoperability between an embedded ActiveX control and an external application using .NET to represent data related to an embedded ActiveX is particularly described herein, it will be understood that according to the invention described herein, and with the relevant modifications in place, a framework other than .NET may be used.

Typically, an instance of an embedded ActiveX control is created, in memory, by the embedding application, at run time. Generally, creating an instance of an embedded ActiveX control (or an instance of other objects) includes loading executable code and variables of the embedded ActiveX control into random access memory (RAM) or other memory such that a controller can execute the loaded code and manipulate loaded variables.

In an exemplary embodiment, the function that creates an embedded ActiveX control is an application programming interface (API) known in the art as CoGetClassObject.

CoGetClassObject may be included in a Dynamic-link library (also written unhyphenated, "dll" or "DLL") provided by Microsoft and used under the Windows operating system to create an uninitialized object of the class associated with a specified CLSID. A CLSID may be a globally unique identifier that identifies a module or unit, e.g., a CLSID may be a unique reference number used as an identifier of a specific embedded ActiveX control. For example, a CLSID may be stored in a registry of an operating system thus enabling uniquely identifying a specific embedded ActiveX control.

Although CoGetClassObject and other API's, dll's, modules or components provided by Microsoft are mainly discussed herein it will be understood that embodiments of the invention are not limited to a specific operating system and other embodiments may be contemplated, e.g., by replacing CoGetClassObject or other modules with modules included in other operating systems.

In an embodiment, a unit or module (e.g., a module that includes a controller and code in COnStart.dll described below) replaces an original component (e.g., the IClassFactory included in a computer) with a modified component. For example, an existing or original IClassFactory included in a system is replaced by a modified IClassFactory. Code in the modified component may be adapted to identify and/or intercept a call for creating a new instance of an ActiveX object (or ActiveX control). For example, a call to the CreateInstance function (used to create a new instance of an embedded object) is intercepted by code in the modified IClassFactory and a pointer to the new instance is obtained from the call. The pointer is examined to determine whether or not the new instance is an instance of a specific embedded object type. For example, the code may determine whether or not the new instance is an ActiveX instance. In an embodiment, if the new instance is not an ActiveX instance, the code may ignore the call. In other embodiments, other embedded object types may be acted upon or ignored.

If the new instance is an ActiveX instance (e.g., an ActiveX control), a pointer and other data related to the new instance may be entered into a pointers container. An interface unit or module (e.g., ICHookCnt described herein) may access the pointers container, may extract data from the pointers container and from the new instance itself. For example, using a pointer in the pointers container, ICHookCnt may directly read from, or write to, memory used by an ActiveX control instance.

ICHookCnt may generate an interface object (e.g., IActiveXWrapper described herein). ICHookCnt may provide the interface object to an external application or client.

Accordingly, an external application may be provided with full access to, or control of, any data or functionality of the embedded ActiveX control.

At any point, e.g., upon request for an interface block, code in COnStart.dll may verify validity of pointers or other data in the pointers container. For example, code in the modified IClassFactory may intercept a call to destroy or terminate an ActiveX control instance and may further update data in the pointers container such that only valid, active or non-terminated ActiveX controls are referenced in the pointers container.

Some of the functions and/or terms referred to herein, e.g., IClassFactory, CoGetClassObject, CLSID, GUID, ProgID, CoClass ID, IOleObject, GetTypeInfo, IDispatch interface, IProvideClassInfo and CreateInstance are known in the art and are well documented (e.g., in http://msdn.microsoft.com/en-us/library/).

Figure 2:
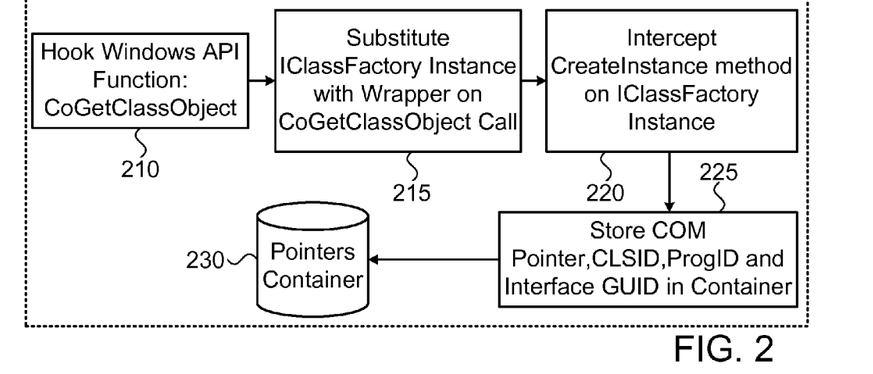
FIG. 2 is a flowchart diagram of a method according to some embodiments of the present invention.

Reference is made to FIG. 2, a flowchart diagram of a method according to some embodiments of the present invention. A shown by block 210, a call to CoGetClassObject may be intercepted. For example, code in CoGetClassObject may be modified such that when CoGetClassObject is called, code in COnStart.dll is executed. The code in COnStart.dll may perform any action or operation and may then return control or execution to the code in CoGetClassObject. Accordingly, functionality may be added to the code in a modified CoGetClassObject function.

In another example, a code in a dll (e.g., code in COnStart.dll) registers with an operating system to receive all calls to CoGetClassObject. Registering with an operating system to receive messages or events may be done as known in the art. Registering with an operating system by a first module to receive messages or events that would otherwise be provided or sent to a second module is known in the art as hooking. For example, CoGetClassObject is hooked by COnStart.dll. Accordingly, an embodiment may include hooking the API CoGetClassObject as shown by block 210.

As known in the art, under the Windows operating system, an IClassFactory interface needs to be implemented for every object register in the system's registry in order to create an instance of the object using a CLSID.

As shown by block 215, COnStart.dll may construct and stores a modified IClassFactory. In an embodiment, a modified IClassFactory generated by COnStart.dll includes an original IClassFactory as present in a system. Accordingly, a modified IClassFactory generated by COnStart.dll may include any data included in an original or previous IClassFactory as well as additional data that COnStart.dll stores in the modified IClassFactory instance.

As known in the art, IClassFactory includes code for a CreateInstance method which creates an instance of an object. Hooked as discussed, each call to IClassFactory is intercepted by COnStart.dll. Accordingly, when an application calls the CreateInstance method included in the IClassFactory instance hooked by COnStart.dll, COnStart.dll may obtain a pointer to the instance to be created. Generally, a pointer may be an address or other reference that enables accessing an object. For example, an instance of an ActiveX object in memory may be associated with an address of the memory such that the object may be accessed, such address may be used (and referred to herein) as a pointer that enables accessing the instance in memory.

In an embodiment, COnStart.dll may check if the object created is an instance of an ActiveX object. For example, since the same methods are used for creating instances of COM objects, COnStart.dll may verify the instance to be created is indeed an instance of an ActiveX object by examining a type field or other data. In other cases, the call to CreateInstance may include a type of the instance to be created. Any method of determining the type of object to be created may be used by COnStart.dll in order to determine the type of object to be created (e.g., whether or not the object to be created is an ActiveX object).

For example, COnStart.dll may ignore calls related to creating COM objects and only act on calls related to ActiveX objects. Accordingly, an embodiment may selectively intercept a creation of an object based on the object type.

As shown by block 220, having hooked CoGetClassObject, COnStart.dll may intercept a call to create an object, e.g., COnStart.dll intercepts calls to the CreateInstance, a method defined in the IClassFactory interface, which, as known in the art, may be used under Windows to create a COM objects. As discussed, COM objects may be similar to ActiveX objects and may be used interchangeably, for example, an ActiveX object may include COM objects. Similarly, Object Linking and Embedding (OLE) objects may be included in ActiveX objects. Generally, OLE is a technology developed and provided by Microsoft. OLE enables embedding and linking documents in/to other objects. The discussion herein may be relevant to any of COM, OLE and ActiveX objects. For example, pointers to any of a COM, OLE or ActiveX objects may be obtained and stored as shown by FIG. 2 and described herein.

As shown by block 225, If COnStart.dll determines a call to CreateInstance is related to an ActiveX object (or, based on a configuration, to a COM or OLE object), COnStart.dll may store a pointer to the instance of the ActiveX object in a pointers container, e.g., in pointers container 230. For example, pointers container 230 may be a file on a disk or it may be a memory segment in a random access memory (RAM) in a computer. In an embodiment, If COnStart.dll determines a call to CreateInstance is not related to an ActiveX object, COnStart.dll may ignore the call. In other embodiments, COnStart.dll may ignore other types of objects or COnStart.dll may act on other types of objects. For example, COnStart.dll may store pointers to COM or OLE objects as described herein or may ignore creation of COM or OLE objects.

As shown by block 225, any relevant data may be stored in pointers' container 230. For example, other than an address or pointer to the object, the CLSID, ProgID (the identification of the program that requested the creation of the object) and a default interface GUID (e.g., obtained from an operating system as known in the art) may be stored in pointers container 230 as shown.

Pointers container 230 may be accessed when needed, e.g., when an external application requests access to an embedded ActiveX object. For example, an executable code segment referred to herein as ICHookCnt may be used to access pointers container 230 and extract therefrom any relevant data. For example, upon request, ICHookCnt may use a CLSID to access pointers container 230, extract data stored therein as described and generate an IActiveXWrapper object that includes any relevant data related to the relevant ActiveX object. For example, using a pointer to an ActiveX object obtained from pointers container 230, ICHookCnt may examine the instance of the object (e.g., the instance in memory as described) and may obtain any values of parameters in the ActiveX instance, names and types of methods included in the ActiveX object and the like.

In an embodiment, COnStart.dll (or other code) may validate ActiveX's pointers in pointers container 230. For example, COnStart.dll may use pointers in pointers container 230 in order to access the relevant memory and verify that the objects pointed to by pointers are still valid. Various means may be used in order to mark an object as valid or invalid. For example, calls to destroy an object in memory may be intercepted and the object (in memory) may be marked as invalid. Accordingly, COnStart.dll (or other code used for interfacing with an external application) may verify ActiveX objects are still valid and only return to a client (e.g., an external application) references of valid ActiveX objects. For example, only IActiveXWrapper objects describing valid ActiveX objects may be return to a requesting client or external application.

Figure 3:
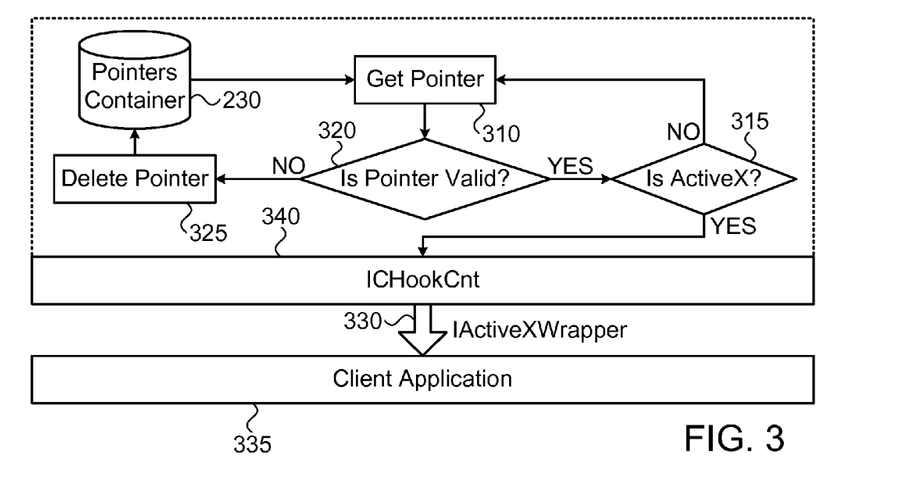
FIG. 3 shows a flowchart and system components according to some embodiments of the present invention.

Reference is now made to FIG. 3, a flowchart and system components according to some embodiments of the present invention. A shown by block 310, a method may include accessing pointers container 230 to get a pointer to an ActiveX object. As discussed, pointers to other objects such as COM or OLE objects may be obtained as shown by block 310. As shown by block 315, a method may include selectively providing descriptors or other information related to embedded objects. For example and as shown by block 315, a method may verify a pointer is related to an ActiveX object and only provide the pointer to an external application if the pointer points to an ActiveX object. As shown by block 320, a method may include verifying the object. For example, verifying an object, instance or pointer may include verifying the relevant instance has not been destroyed. As shown by block 325, a method may include deleting a pointer from pointers container 230 if the object is not longer valid, e.g., the related instance in memory was destroyed. As shown by arrow 330, an IActiveXWrapper object may be provided to a client or external application thus providing the external application with an interface to an object or instance of an object embedded in an embedding application.

Below are some exemplary code segments that may be used to implement methods and flows described herein. For example, in an embodiment, to modify an existing or original IClassFactory the CoGetClassObject function in an existing IClassFactory may be modified using the code shown below (e.g., COnStart.dll may include the below code):

```
STDAPI CCoGetClassObject(REFCLSID rclsid, DWORD dwClsContext,
LPVOID pvReserved, REFIID riid, LPVOID * pp)
{
    HRESULT hr = pCoGetClassObject(rclsid, dwClsContext,
    pvReserved, riid, pp);
    bool bSkip = false;
    // Do not hook these class objects
    if(IsEqualGUID(rclsid, _uuidof(Procedure))
        || IsEqualGUID(rclsid, _uuidof(Procedures))
        || IsEqualGUID(rclsid, _uuidof(Module))
        || IsEqualGUID(rclsid, _uuidof(Modules))
        || IsEqualGUID(rclsid, _uuidof(Error))
        || IsEqualGUID(rclsid, _uuidof(ScriptControl))
        || IsEqualGUID(rclsid, _uuidof(InternetSecurityManager))
        || IsEqualGUID(rclsid, _uuidof(Protocol))
        || IsEqualGUID(rclsid, _uuidof(JVBScript))
        || IsEqualGUID(rclsid, _uuidof(ProxyStubMarshaller))
        || SkipObject(progID))
        bSkip = true;
    // Create IClassFactory Instance to wrap the original one
    if(SUCCEEDED(hrStore) && SUCCEEDED(hr) &&
        (IID_IClassFactory = = riid ||
IID_IClassFactory2 == riid) && !bSkip){
        CComObject<CClassFactory>* pcf =
        new CComObject<CClassFactory>( );
        if (pcf != NULL){
            pcf->SetVoid(NULL);
            HRESULT hRes = pcf->FinalConstruct( );
            if (hRes != S_OK){
                delete pcf;
                pcf = NULL;
```

```
        }
        else{
            // Put the original pointer of IClassFactory into our IClassFactory
instance
            pcf->Init((IUnknown*)*ppv, &rclsid);
            // Substitute IClassFactory Instance with ours
            pcf->_InternalQueryInterface(riid, pp);
        }
    }
}
return hr;
}
``` where pCoGetClassObject is the address of the original CoGetClassObject function.

As described, method CreateInstance is used to create an instance of an ActiveX object. In an embodiment, in order to intercept a call to CreateInstance, a modified IClassFactory is used to replace an original IClassFactory. The modified IClassFactory includes a modified CreateInstance method designed to obtain a pointer to an object instance and store the pointer (and an associated CLSID) in pointers container 230 as shown by the code below:

```
STDMETHODIMP CClassFactory::CreateInstance(IUnknown
    *pUnkOuter,    REFIID    riid, LPVOID *ppyObject)
{
    IClassFactoryPtr cf = o;
    IClassFactory2Ptr cf2 = o;
    HRESULT hr = E_POINTER;
    if(cf2 != 0)
        hr = cf2->CreateInstance(pUnkOuter, riid, ppyObject);
    else if(cf ! = 0)
        hr = cf ->CreateInstance(pUnkOuter, riid, ppyObject);
    if(hr == S_OK) {
        OLECHAR* lpsz = NULL;
        HRESULT hrStore = ProgIDFromCLSID(*rclsid, &lpsz);
        if(!SUCCEEDED(hrStore))
            hrStore = StringfromCLSID(*rclsid, &lpsz);
        if(SUCCEEDED(hrStore) && !SkipObject(lpsz)) {
            m_oClsid = lpsz;
            CoTaskMemfree(lpsz);
            ITypeInfoPtr spTypeInfo;
            IID iid;
            IUnknownPtr spUnk((IUnknown*)*ppyObject);
            InterfaceTypeInfofromObjectAndIID(spUnk,
                *rclsid, &spTypeInfo);
            GetDefaultInterfaceIID(spTypeInfo, iid);
            hr = StringfromCLSID(iid, &lpsz);
            m_oClsidIIdMap[lpsz] = m_oClsid;
            CoTaskMemfree(lpsz);
            if(SUCCEEDED(hrStore) && !SkipObject(lpsz) &&
                *ppyObject != 0)
                srcObjContainer.Add2Container(*rclsid,
                    (LPUNKNOWN)*ppyObject);
        }
    }
    return hr;
}
```

An external application (or a client) may access pointers using standard COM interface as known in the art. For example, as shown by block 340 in FIG. 3, ICHookCnt may include the code below that may be used to return an IActiveXWrapper instance to a client or to an external application:

interface ICHookCnt: IDispatch
{
[propget, id(1), helpstring("property ActiveXes")] HRESULT ActiveXes([out, retval] SAFEARRAY(LPUNKNOWN)*pVal);
[propget, id(2), helpstring("property Length")] HRESULT Length([out, retval] long*pVal);

[id(3), helpstring("method Clear")] HRESULT Clear( )
};

ICHookCnt may return an array of IActiveXWrapper instances that may include any data related to ActiveX object instances. For example, an IActiveXWrapper may include properties of an ActiveX object instance like a placement, the type library ID, CoClassID, GUID (the functionality description library ID of an ActiveX object), CoClassID (e.g., the CLSID of an ActiveX object) etc.

An exemplary IActiveXWrapper may be represented using the code below:
interface IActiveXWrapper: IDispatch
{
    [propget, id(1), helpstring("property ClsID")] HRESULT ClsID([out, retval] BSTR*pVal);
    [propget, id(2), helpstring("property IID")] HRESULT IID([out, retval] BSTR*pVal);
    [propget, id(3), helpstring("property ProgID")] HRESULT ProgID([out, retval] BSTR*pVal);
    [propget, id(4), helpstring("property MarshalID")] HRESULT MarshalID([out, retval] BSTR*pVal);
    [propget, id(5), helpstring("property InstanceID")] HRESULT InstanceID([out, retval] long*pVal);
    [propget, id(6), helpstring("property Window")] HRESULT Window([out, retval] long*pVal);
    [id(7), helpstring("method MarshalInterface")] HRESULT MarshalInterface( )
    [propget, id(8), helpstring("property X")] HRESULT X([out, retval] long*pVal);
    [propget, id(9), helpstring("property Y")] HRESULT Y([out, retval] long*pVal);
    [propget, id(10), helpstring("property Width")] HRESULT Width([out, retval] long*pVal);
    [propget, id(11), helpstring("property Height")] HRESULT Height([out, retval] long*pVal);
    [propget, id(12), helpstring("property IsWindowless")] HRESULT IsWindowless([out, retval] VARIANT_BOOL*pVal);
}

To generate an IActiveXWrapper object (or an array of IActiveXWrapper objects), code in COnStart.dll may select only ActiveX instances (e.g., exclude COM instances) using the code below. In the below exemplary code, the ActiveX instance is a COM reference that implements the IOleObject interface, info→pUnknown is the COM pointer obtained as described and the info structure filled is the data to be passed to the client.
AXInfo*info
// Check if COM Instance is windowed
long result=0;
IOleWindowPtr spWindow=spWindow=info→pUnknown;
if(spWindow !=NULL)
    spWindow→GetWindow((HWND*)&result);
If the COM instance has a Window Handle (result !=0) then in place information related to an ActiveX object in the info structure above may include data as shown below:
    RECT rc;
    ::GetWindowRect((HWND)result, &rc);
    info→nX=rc.left;
    info→nY=rc.top;
    info→nWidth=rc.right-rc.left;
    info→nHeight=rc.bottom-rc.top;
    info→hWnd=result;
    info→bIsWindowless=false;

If the window handle equals "0" then it maybe that the COM instance is a windowless ActiveX instance. Code shown below (that may be included in COnStart.dll) may verify the type of the current instance:

```
// Check if COM Pointer is Ole Object
IOleObjectPtr spOleObject = IUnknownPtr(info->pUnknown);
if(spOleObject != 0)
{
    IOleClientSitePtr spOleClientSite;
    // ActiveX should implement IOleClientSite Interface
    spOleObject->GetClientSite(&spOleClientSite);
    if(spOleClientSite != NULL)
    {
        // IOleInPlaceSite Instance should give ActiveX's data in the application
        IOleInPlaceSitePtr spOleInPlaceSite =spOleClientSite;
        if(spOleInPlaceSite != NULL)
        {
            OLEINPLACEFRAMEINFO inplaceInfo;
            IOleInPlaceFramePtr spOleInPlaceframe;
            IOleInPlaceUIWindowPtr spOleInPlaceUIWindow;
            RECT rcPos;
            RECT rcClip;
            // COM Instance is a windowless ActiveX
            // Get ActiveX Container Window Handle
            spOleInPlaceSite->GetWindow((HWND*)&result);
            memset(&inplaceInfo, sizeof(OLEINPLACEFRAMEINFO), 0);
            inplaceInfo.cb =sizeof(OLEINPLACEFRAMEINFO);
            // Get ActiveX Container Window information
            spOleInPlaceSite->GetWindowContext(&spOleInPlaceFrame,
                &spOleInPlaceUIWindow,
                &rcPos,
                &rcClip,
                &inplaceInfo);
            info->nX = rcPos.left;
            info->nY = rcPos.top;
            info->nWidth = rcPos.right - rcPos.left;
            info->nHeight = rcPos.bottom - rcPos.top;
            info->hWnd = result;
            info->bIsWindowless = true;
        }
    }
}
```

If an ActiveX instance supports the IDispatch interface, the type of the ActiveX instance may be determined using the GetTypeInfo method defined by the IDispatch Interface protocol. Other software methods may be used, e.g., the ProvideClassInfo or GetClassInfo. In an embodiment, type of the ActiveX instance may be determined by reading system registries.

In an embodiment, data describing properties or other aspects of an ActiveX instance may be represented as numbers, strings and boolean variables. Boolean variables are special variables that may only assume one of two values (e.g., "1" or "0"). For example, the structure below may represent an ActiveX instance:
class CCustomProperyValue
{
public:
    VARIANT_BOOL m_bSelected;
    VARTYPE m_vt;
    _bstr_t m_sName;
    _bstr_t m_sValue;
    CCustomProperyValue(    ):m_bSelected(VARIANT_FALSE),m_sValue(L" "){ }
    CCustomProperyValue(const CCustomProperyValue& prop):m_bSelected(VARIANT_FALSE),m_sValue(L" ")
    {
        m_bSelected=prop.m_bSelected;
        m_vt=prop.m_vt;
        m_sName=prop.m_sName;

```
m_sValue=prop.m_sValue;
}
CCustomProperyValue& operator=(const CCustomProp-
eryValue& prop)
{
    m_bSelected=prop.m_bSelected;
    m_vt=prop.m_vt;
    m_sName=prop.m_sName;
    m_sValue=prop.m_sValue;
    return*this;
}
};
```

Figure 4:
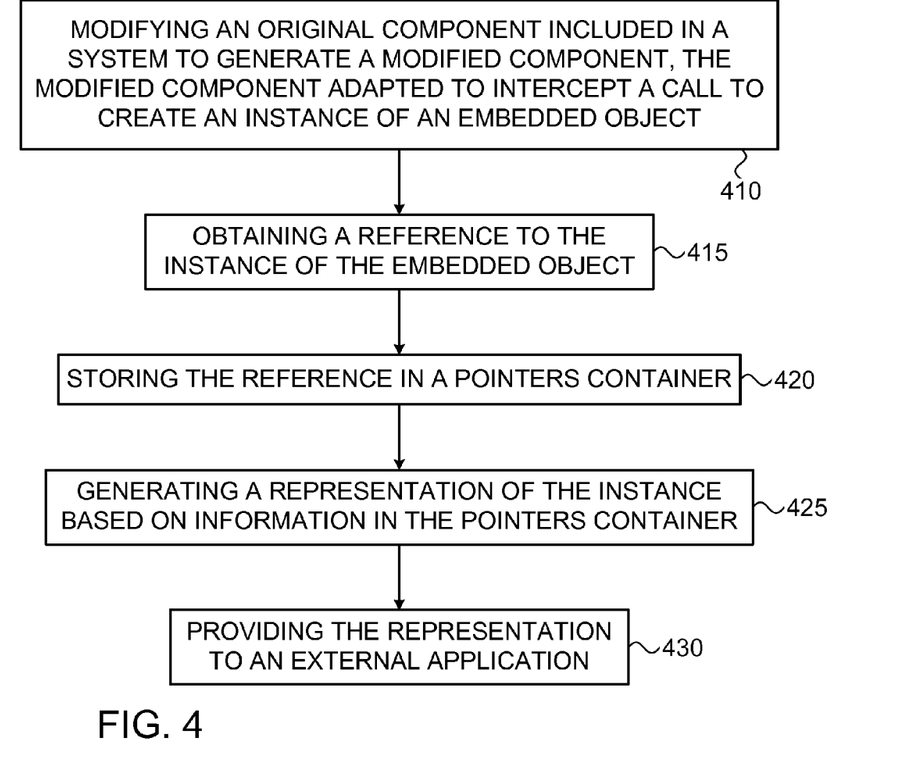
FIG. 4 shows a flowchart describing a method according to some embodiments of the present invention.

Reference is now made to FIG. 4, a flowchart describing a method according to some embodiments of the present invention. As shown by block 410, a method or flow may include modifying an original component included in a system to generate a modified component, the modified component adapted to intercept a call to create an instance of an embedded object. For example, an existing or original IClassFactory as provided by Microsoft (e.g., included in an installation of the Windows operating system) is modified to generate a modified IClassFactory as described herein.

As shown by block 415, a method or flow may include obtaining a reference to the instance of the embedded object. For example, code in the modified IClassFactory is adapted to intercept a call from an embedding application to create an instance of an ActiveX object, analyze the call and identify or obtain a pointer to the instance. For example, in an embodiment, the pointer is the address of the memory into where the object is loaded and where the instance is executed.

As shown by block 420, a method or flow may include storing the reference in a pointers container. For example, in an embodiment, a pointer (and other data related to an ActiveX instance) is stored in pointers container 230. Pointers container may be any suitable container that enables accessing pointers therein.

As shown by block 425, a method or flow may include generating a representation of the instance based on information in the pointers container. For example, an IActiveX-Wrapper object representing an ActiveX instance may be created using data in pointers container 230 as described herein.

As shown by block 430, a method or flow may include providing the representation to the external application. For example, an ActiveX Container, presented by ICHookCnt interface may provide client 335 with a representation of a set of ActiveX instances using a set of IActiveXWrapper objects. For example, client 335 may be a monitoring unit or application that may receive (periodically or based on a request) representations of an ActiveX instances including any data collected for each ActiveX instance. Accordingly, a monitoring unit may monitor an ActiveX instance. It will be noted that the monitoring unit may be remote, and data related to an ActiveX instance may be sent to the monitoring unit using COM marshalling technology as known in the art. Any format or COM marshalling protocol may be used to represent and send an IActiveXWrapper object or other data related to an instance of an embedded object. For example, ICHookCnt 340 may format and send IActiveXWrapper objects or other data related to an instance of an embedded object according to, and/or using the, .NET framework. For example, providing a representation to an external application may include COM marshalling as known in the art (e.g., as described in (http://msdn.microsoft.com/enus/library/windows/desktop/ms692621%28v=vs.85%29.aspx).

As described, generation of a representation may be selective. For example, based on intercepting and analyzing a call to create an instance of an embedded object, code in COnStart.dll may determine the type of the instance to be created and only generate a representation for (or store reference to) the instance if it is related to an ActiveX object (e.g., code in COnStart.dll may ignore calls related to creating instances of COM objects). As described, a representation may be generated based on request. For example, client 335 may request ICHookCnt 340 to generate and provide a representation of an instance.

Figure 5:
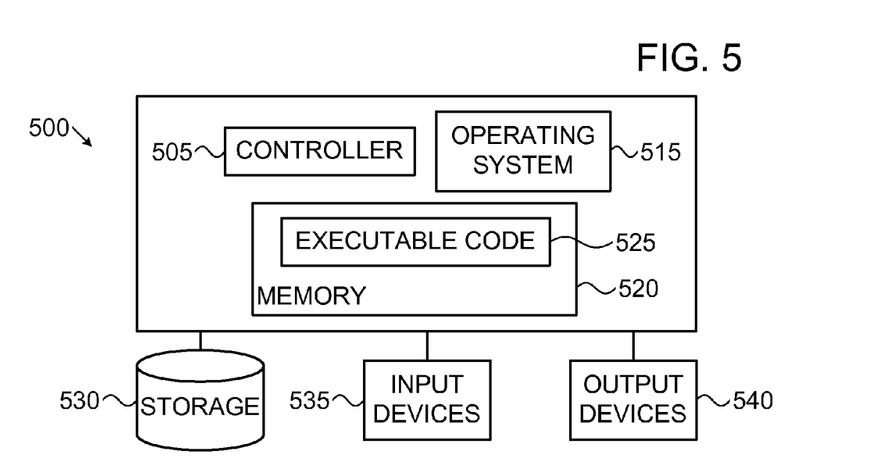
FIG. 5 shows a high level block diagram of an exemplary computing device according to embodiments of the present invention.

Reference is made to FIG. 5, showing high level block diagram of an exemplary computing device 500 according to embodiments of the present invention. Computing device 500 may include a controller 505 that may be, for example, a central processing unit processor (CPU), a chip or any suitable computing or computational device, an operating system 515, a memory 520, a storage 530, an input devices 535 and an output devices 540.

Operating system 515 may be or may include any code segment designed and/or configured to perform tasks involving coordination, scheduling, arbitration, supervising, controlling or otherwise managing operation of computing device 500, for example, scheduling execution of programs. Operating system 515 may be a commercial operating system. For example, in an embodiment, operating system 515 is the Windows operating system provided by Microsoft.

Memory 520 may be or may include, for example, a Random Access Memory (RAM), a read only memory (ROM), a Dynamic RAM (DRAM), a Synchronous DRAM (SD-RAM), a double data rate (DDR) memory chip, a Flash memory, a non-transitory memory or other suitable memory units or storage units. In an embodiment, memory 520 is a non-transitory processor-readable storage medium that stores instructions and the instructions are executed by controller 505.

Executable code 525 may be any executable code, e.g., an application, a program, a process, task or script. Executable code 525 may be executed by controller 505 possibly under control of operating system 515. For example, executable code 525 may be an application that performs methods described herein. For example, executable code 525 may be or may include code included in COnStart.dll or other software modules described herein.

Where applicable, executable code 525 may carry out operations described herein in real-time. Computing device 500 and executable code 525 may be configured to update, process and/or act upon information at the same rate the information, or a relevant event, are received. For example, providing a representation of an ActiveX instance may be done in real-time, e.g., immediately upon receiving a request from a client or an external application. Monitoring an instance may be done in real-time. For example, a memory where an ActiveX instance stores data may be continuously checked (e.g., at very small time intervals) such that a client or external application is provided with a real-time representation of the instance.

Storage 530 may be or may include, for example, a hard disk drive, a CD-Recordable (CD-R) drive, a universal serial bus (USB) device or other suitable removable and/or fixed storage unit.

Input devices 535 may be or may include a mouse, a keyboard, a touch screen or pad or any suitable input device. It will be recognized that any suitable number of input devices may be operatively connected to computing device 500 as shown by block 535. Output devices 540 may include one or more displays, speakers and/or any other suitable output devices. It will be recognized that any suitable number of output devices may be operatively connected to computing device 500 as shown by block 540. A unit or module as described herein may be or may include executable code 525 and controller 505. For example, methods described herein may be performed by computing device 500 and a unit or module adapted to intercept a call to create an instance of an embedded object may be a unit that includes executable code 525 and controller 505.

Embodiments of the invention may include an article such as a computer or processor non-transitory readable medium, or a computer or processor non-transitory storage medium, such as for example memory 520, a disk drive, or a USB flash memory, encoding, including or storing instructions, e.g., computer-executable instructions, which, when executed by a processor or controller (e.g., controller 505), carry out methods disclosed herein. For example, a storage medium such as memory 520, computer-executable instructions such as executable code 525 and a controller such as controller 505.

A system according to embodiments of the invention may include components such as, but not limited to, a plurality of central processing units (CPU) or any other suitable multi-purpose or specific processors or controllers, a plurality of input units, a plurality of output units, a plurality of memory units, and a plurality of storage units. A system may additionally include other suitable hardware components and/or software components. In some embodiments, a system may include or may be, for example, a personal computer, a desktop computer or a server computer.

Embodiments of the invention may be related to real-time or run time scenarios as described herein. For example, enabling interoperability between an ActiveX instance embedded in an embedding application and an external application by obtaining a reference to the instance of the embedded object; generating a representation of the instance based on information in a memory pointed to by the pointer; and providing the representation to the external application may be performed in real-time or at run time, e.g., upon creation of the instance of the embedded object. Other aspects of real-time or run time may be causing an ActiveX instance to perform an action (e.g., by calling methods of the ActiveX instance).

Embodiments of the invention may be related to off-line or design time aspects, scenarios or operations. For example, at design time, ActiveX objects may be examined and profiled. For example, a profile, attributes or characteristics of an ActiveX object may be used in order to later identify the object. For example, characterizing or profiling an ActiveX object includes recording information retrieved from the ActiveX object (or from a memory used by the ActiveX object). For example, various values, names, fields, attributes and the like obtained from the ActiveX object may be stored as a description, profile or characteristics of the ActiveX object.

An identification parameter (ID) value or code may be associated with a description, profile or characteristics of an ActiveX object. The ID may later be used, e.g., at run time, as described herein. For example, a list that includes both an ID and an associated profiles or description of an ActiveX object may be generated and provided to a module at run time.

For example, a profile or description of an ActiveX object may include a set of properties (e.g., a set of properties or variables) that store or represent properties and a set of states that stores or sets (e.g., a set of properties or variables) that store or represent states. For example, properties stored or represented for an ActiveX object may be ProgID, ClassID, Interface ID, Index in Type (ClassID), coordinates, width and height. Properties of an ActiveX object such as ProgID discussed herein are well known in the art. For example, states stored or represented for an ActiveX object may be "Enabled", "Visible", "Has Focus" and "Windowless". Other, e.g., optional or extended properties stored or represented for an ActiveX object may be primitive values etc.

To generate a description or profile of an ActiveX object, the ActiveX object may be executed to create an instance of the ActiveX object, a pointer to the ActiveX instance and its memory may be obtained as described herein and any information required for profiling or characterizing the object may be obtained using the pointer to read memory or by interacting with the ActiveX instance. Data describing an ActiveX object may be stored. For example, the code or structure below may be used to represent, profile or characterize an ActiveX instance:

```
class CVseActiveX : public CVseObject
{
public:
// ==CVseActiveX==============
    CVseKind m_enKind;              // stores VS reflection kind of
standard ActiveX objects
    DWORD m_dwParent;               // parent object id
    //
    // Specific/dynamic/run-time data for a specific ActiveX instance goes
here....
    //
    RECT            m_rcObject;         // ActiveX object rectangle
    CVseString      m_sCoClassName;     // ActiveX object class name
    CVseString      m_sProgID;          // ActiveX object ProgID name
    CVseString      m_sIID;             // ActiveX object default interface IID
    CVseString      m_sTypeLibIID;
    long            m_lTypeLibMaxVer;
    long            m_lTypeLibMinVer;
    long            m_lIndex;           // ActiveX in Type object index
    DWORD           m_dwState;          // ActiveX object state flags:
    CCustomProperties m_oCustomProps;
    enum eStateFlags
    {
        sfEnabled = 0x00000001,
        sfVisible = 0x00000002,
        sfHasFocus = 0x00000004,
        sfWindowless = 0x00000008
    };
    union UIdfRules
```

-continued

```
{
  DWORD dwFlags[2]; // ActiveX object identification flags:
  struct
  {
    bool useParent              :1;
    bool useProgID         :1
    bool useCoClassName         :1;
    bool useIID                 :1;
    bool useIndex               :1;
    bool useCustomProps         :1;
    bool useRectX               :1;
    bool useRectY               :1;
    bool useRectW               :1;
    bool useRectH               :1;
    bool isProgIDAsSubstr:      :1;
    bool isProgIDCaseSens:      :1;
    DWORD                       :0; // Force alignment to next DWORD
boundary (32 bits in this case).
    bool useWindowless          :1;
    bool useEnabled             :1;
    bool useVisible               :1;
    bool useHasFocus              :1;
    // Note: do not exceed 64 (32+32) entries or define new storage
version!!!
  };
  UIdfRules( ) { ZeroMemory( dwFlags, sizeof(dwflags));
            useCoClassName=true, useIID   =   true, useProgID   =   true,
useIndex = true, useCustomProps = false,
            useWindowless = true, useVisible = true; };
  } m_uIdfRules;
  // this is valid only for main (scene) anchor:
  CVseActiveXWindow* m_pSceneWindowInfo;
public:
  CVseActiveX( );
  ~CVseActiveX( ) { DeleteAll( ); }
  virtual BOOL    Serialize(CVseStream& stream);
  virtual void    DeleteAll( );
};
```

At design time, an instance of the structure or code above may be filled with values read from a memory of the ActiveX instance (e.g., strings, values, boolean values as shown in the code above). The data stored for an ActiveX object may include and/or be associated with an ID and may be stored, e.g., in a dll or in a file, e.g., a .NET module as known in the art.

Figure 6:
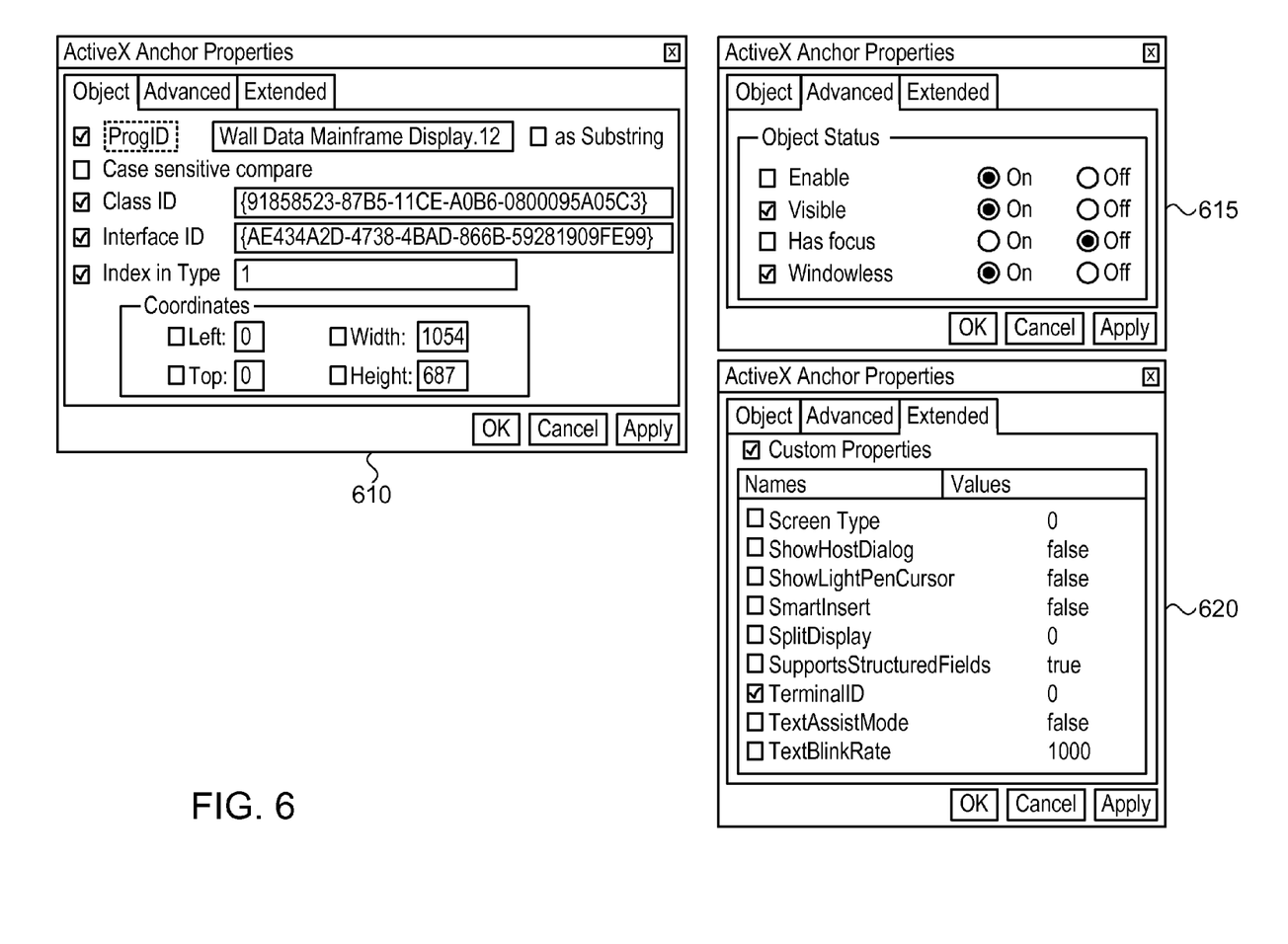
FIG. 6 shows exemplary screenshots according to embodiments of the present invention.

Reference is made to FIG. 6 which shows exemplary screenshots according to embodiments of the invention. For example, a software module (not shown) may be used at design or development time in order to enable a programmer to select which parameters or attributes of an ActiveX object (also referred to herein as the target ActiveX object) will be used in order to later identify the ActiveX object. For example, the target ActiveX object may be executed and the software module may obtain a pointer to an instance of the ActiveX instance as described herein. Accordingly, the software module may obtain any parameter or value related to the ActiveX object. For example, as shown by screenshot 610, common identification parameters may be presented and checkboxes may be used in order to select which of the common identification parameters will be included in a characterization of the ActiveX object. As shown by screenshot 615, state parameters may be presented and selected for inclusion in a profile or characterization of the ActiveX object. As shown by screenshot 620, optional or native property values may be presented and selected for inclusion in a profile or characterization of the ActiveX object.

For example, as shown by screenshot 610, a user may select that the class ID and interface ID will be included in a description of the ActiveX object and later be used in order to identify the ActiveX object. As further shown by screenshot 610, a user may select not to include the coordinates of a screen presented by the ActiveX object. Accordingly, the ActiveX object may be identified regardless of the location of a screen presented by the ActiveX object and based (at least in part) on the class and interface IDs. Similar options for including or excluding various attributes or values related to the ActiveX object are exemplified in screenshots 615 and 620.

In an embodiment, states (also referred to herein as "scenes") of an application may be identified or defined based on the number and/or type (e.g., ID) of the active ActiveX objects. For example, in a first state (or scene) a first ActiveX object in an application may be activated by the application, in a second state, two, same, ActiveX objects may be activated by the application and in a third state, two different ActiveX objects may be activated by the application. For example, a project activates a scene that identifies the application state, accordingly, when the scene (state) is activated, the ActiveX is available for use as described herein.

State information including information characterizing ActiveX objects may be provided to an interface software module. Accordingly, provided with information usable to identify a state (or scene) and the relevant ActiveX instances, an interface module or unit may readily and quickly determine, at run time, a state of an application including determining the type and number of active ActiveX objects.

In an embodiment, a state or scene defines and/or describes a state of an application by including in the definition or description identifications of the ActiveX objects that are active in that state (also referred to herein as anchors). An active ActiveX object as referred to herein is an instance of the ActiveX object created when the application executes an object of the ActiveX object. For example, to create an instance, the code of the ActiveX object is loaded into RAM and executed therefrom. For example, a scene or states includes a list of IDs of all ActiveX objects active in the state. In an embodiment, each ActiveX object included in a scene is represented by parameters, values and attributes as defined, by a programmer, using the checkboxes as shown in FIG. 6.

As described herein, using an ID of an ActiveX object, an interface module may readily obtain a description of the object, including all the methods and variables defined in (or supported by) the ActiveX object. Accordingly, an interface module or software unit may examine ActiveX objects executed by an application and may determine that the application is in a known state. As described, the IDs all ActiveX objects may be known and provided to the interface unit. Accordingly, when a state or scene is identified or determined, any data required in order to provide an interface to any of the active ActiveX objects that are active at the identified state may be available to an interface unit (e.g., provided in a dll or other form).

For example, having identified a state or scene, an interface software module may immediately provide an interface that enables an external application to control ActiveX instances in the state, e.g., call methods or read values of ActiveX instances, change ActiveX instances' parameters and properties etc. For example, the external application can use the provided interface to simulate key/mouse actions and receive any ActiveX's events.

Moreover, any representation of the active ActiveX objects may be generated in advance and made available to the interface unit or module. Accordingly, having identified a state or scene, an interface unit may immediately provide an interface to any of the active ActiveX objects. For example, upon determining a state of an application, methods of relevant ActiveX objects may be immediately provided to an external application that may then interact with any of the active ActiveX objects, e.g., cause an ActiveX instance or perform an action e.g., execute a method defined by the ActiveX object, modify attributes (e.g., a background color of a screen presented by an ActiveX instance) and so on.

The use of Type Libraries is well known in the art (for example, as described in (http://msdn.microsoft.com/enus/library/windows/desktop/ms221581%28v=vs.85%29.aspx). As known, a type library object for an ActiveX object may be obtained by calling the LoadRegTypeLib function provided by Microsoft. In an embodiment, at design time, or while developing a project, a type library object loaded into memory may be used for generating an interface DLLs with the Windows API. For example, the code shown below may be used:

```
internal static Assembly MakeOrLoadComInterop(ITypeLib typeLib)
{
    if (typeLib != null)
    {
        typeLib.GetDocumentation(TYPEATTR.MEMBER_ID_NIL, out libName, out ph, out c, out ph);
        if (WrapperGeneratorEx.ProjectLocation.Length > 0)
        {
            string location;
            if (!Directory.Exists(WrapperGeneratorEx.ProjectLocation))
                Directory.CreateDirectory(WrapperGeneratorEx.ProjectLocation);
            location = WrapperGeneratorEx.ProjectLocation;
            if (!location.EndsWith(" "+ Path.DirectorySeparatorChar))
                location = location + Path.DirectorySeparatorChar;
        }
        else
        {
            string location;
            location = Assembly.GetExecutingAssembly( ).Location;
            location        =        location.Substring(0, location.LastIndexOf(Path.DirectorySeparatorChar) + 1);
            WrapperGeneratorEx.ProjectLocation = location;
        }
        // Create Interop dll
        if (!File.Exists(WrapperGeneratorEx.ProjectLocation     +     libName     +     ".dll"))
        {
            if (!AXInteropGen.assemblies.ContainsKey(libName))
            {
System.Runtime.InteropServices.TypeLibConverter        tlConvert        =        new System.Runtime.InteropServices.TypeLibConverter( );
assemb        =        (Assembly)tlC onvert.ConvertTypeLibToAssembly(typeLib, WrapperGeneratorEx.ProjectLocation    +    libName    +    ".dll",
(int)(System.Runtime.InteropServices.TypeLibImporterFlags.PrimaryInteropAssembly |
System.Runtime.InteropServices.TypeLibImporterFlags.PrimaryInteropAssembly |
System.Runtime.InteropServices.TypeLibImporterFlags.UnsafeInterfaces |
System.Runtime.InteropServices.TypeLibImporterFlags.SafeArrayAsSystemArray |
System.Runtime.InteropServices.TypeLibImporterFlags.ImportAsAgnostic |
//System.Runtime.InteropServices.TypeLibImporterFlags.PreventClassMembers |
System.Runtime.InteropServices.TypeLibImporterFlags.TransformDispRetVals),
            new ConversionEventHandler( ), null, null, true);
        (ass as AssemblyBuilder).Save(libName    +    ".dll");
        AXInteropGen.assemblies.Add(libName, assemb);
            }
        }
    }
    return assemb;
}
```

For example, using the code above, ActiveX code (e.g., code of COM or other objects) may be transformed into .NET code and a client side component or interface module may be generated based on the .NET code.

For example, an exemplary CellFromPoint method may be represented in COM code by the code below:

[id(0x60030082), helpstring("Gets the cell which contains the given X,Y coordinates (relative to the grid) in pixels.")]
HRESULT CellFromPoint([in] long xPixels, [in] long yPixels, [in, out] long*lRow, [in, out] long*lCol);

The exemplary CellFromPoint method may be represented in .NET code by the code below:
[MethodImpl(MethodImplOptions.InternalCall, MethodCodeType=MethodCodeType.Runtime), DisId (0x60030082)]
public virtual extern void CellFromPoint([In] int xPixels, [In] int yPixels, [In, Out] ref int lRow, [In, Out] ref int lCol);

The exemplary CellFromPoint method may be represented in a client side interface by code by the code below:
[DirectDom("CellFromPoint")]
[Direct.Shared.MethodDescriptionAttribute("Gets the cell which contains the given X,Y coordinates (relative to the grid) in pixels. \r\n")] public Direct Collection<Direct.Shared.Objects.Object>CellFromPoint (int xPixels, int yPixels)

Unless explicitly stated, the method embodiments described herein are not constrained to a particular order or sequence. Additionally, some of the described method embodiments or elements thereof can occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

What is claimed is:

1. A computer-implemented method of enabling interoperability between an object embedded in an embedding application and an external application, the method comprising:
   modifying an original component included in a system to generate a modified component, the modified component adapted to intercept a call to create an instance of the embedded object;
   obtaining a reference to the instance of the embedded object;
   storing the reference in a pointers container;
   generating a representation of the instance based on information in the pointers container; and
   providing the representation to the external application.

2. The method of claim 1, wherein generating the representation of the instance is performed in real-time.

3. The method of claim 1, comprising sending, to a monitoring unit, data related to the instance of the embedded object.

4. The method of claim 1, comprising selectively generating a representation for a given instance of an embedded object based on a type of the embedded object.

5. The method of claim 1, comprising generating the representation according to a .NET framework.

6. The method of claim 1, comprising generating the representation upon receiving a request from the external application.

7. The method of claim 1, comprising determining the instance of the embedded object was destroyed and removing the reference from the pointers container.

8. The method of claim 1, wherein the instance of the embedded object is an ActiveX object.

9. An article comprising a non-transitory computer-readable storage medium, having stored thereon instructions, that when executed on a computer, cause the computer to:
   modify an original component included in a system to generate a modified component, the modified component adapted to intercept a call to create an instance of the embedded object;
   obtain a reference to the instance of the embedded object;
   storing the reference in a pointers container;
   generate a representation of the instance based on information in the pointers container; and
   provide the representation to an external application.

10. The article of claim 9, wherein generating the representation of the instance is performed in real-time.

11. The article of claim 9, wherein the instructions when executed further result in sending, to a monitoring unit, data related to the instance of the embedded object.

12. The article of claim 9, wherein the instructions when executed further result in selectively generating a representation for a given instance of an embedded object based on a type of the embedded object.

13. The article of claim 9, wherein the instructions when executed further result in generating the representation according to a .NET framework.

14. The article of claim 9, wherein the instructions when executed further result in generating the representation upon receiving a request from the external application.

15. The article of claim 9, wherein the instructions when executed further result in determining the instance of the embedded object was destroyed and removing the reference from the pointers container.

16. The article of claim 9, wherein the instance of the embedded object is an ActiveX object.

* * * * *